(12) United States Patent
Yamamoto

(10) Patent No.: US 8,103,107 B2
(45) Date of Patent: Jan. 24, 2012

(54) VIDEO-ATTRIBUTE-INFORMATION OUTPUT APPARATUS, VIDEO DIGEST FORMING APPARATUS, COMPUTER PROGRAM PRODUCT, AND VIDEO-ATTRIBUTE-INFORMATION OUTPUT METHOD

(75) Inventor: Koji Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1000 days.

(21) Appl. No.: 12/007,570

(22) Filed: Jan. 11, 2008

(65) Prior Publication Data
US 2008/0175486 A1 Jul. 24, 2008

(30) Foreign Application Priority Data
Jan. 18, 2007 (JP) ................. 2007-008909

(51) Int. Cl.
*G06K 9/52* (2006.01)
(52) U.S. Cl. ......... 382/206; 382/190; 382/306; 348/700
(58) Field of Classification Search .............. 382/190, 382/206, 306; 348/700
See application file for complete search history.

(56) References Cited

U.S. PATENT DOCUMENTS

| | | | | |
|---|---|---|---|---|
| 2001/0004739 A1* | 6/2001 | Sekiguchi et al. | ............ | 707/100 |
| 2003/0218696 A1* | 11/2003 | Bagga et al. | .............. | 348/700 |
| 2005/0089224 A1 | 4/2005 | Aoki | | |
| 2007/0055695 A1* | 3/2007 | Dorai et al. | ............. | 707/104.1 |
| 2009/0066845 A1 | 3/2009 | Okuda | | |

FOREIGN PATENT DOCUMENTS

| | | |
|---|---|---|
| JP | 09-009199 | 1/1997 |
| JP | 2000-132563 | 5/2000 |
| JP | 2001-177806 | 6/2001 |
| JP | 2003-061036 | 2/2003 |
| JP | 2003-283968 | 10/2003 |
| JP | 2004-336556 | 11/2004 |
| JP | 2005-109566 | 4/2005 |
| JP | 2005-130416 | 5/2005 |
| JP | 2007-006454 | 1/2007 |

OTHER PUBLICATIONS

Kobayashi, JP2000-132563, the English version translated by machine.*
U.S. Appl. No. 11/687,772, filed Mar. 19, 2007.
Yamauchi, Masaki et al., *A New Video Indexing Technique Based on Perceptual Clustering Using Extraction of Region of Interest;* Jan. 27, 2006; vol. 30; No. 9; pp. 41-46.
Yaji, Takafumi et al., *Automatic Summary Generation of Baseball Games by Using Telop Information; IEICE Technical Report of the Institute of Electronics, Information and Communication Engineers;* Nov. 17, 2005; vol. 105; No. 431; pp. 29-34.
Office Action dated Jul. 19, 2011 in JP 2007-008909 and partial English-language translation of same.

* cited by examiner

*Primary Examiner* — Samir Ahmed
*Assistant Examiner* — Ruiping Li
(74) *Attorney, Agent, or Firm* — Nixon & Vanderhye, P.C.

(57) ABSTRACT

An attribute-information-area extracting unit extracts an attribute information area in which attribute information is displayed when the attribute information area does not change between certain frames of adjacent scenes obtained by dividing a video content by a scene dividing unit. A character-areas extracting unit extracts character areas in which video attribute information in individual characters that is metadata of the video content of the attribute information area are present, and a character-area-meaning assigning unit assigns meanings to the character areas. A character-area reading unit reads the video attribute information, from the character areas to which meanings are assigned, thereby outputting the video attribute information.

13 Claims, 17 Drawing Sheets

FIG.14
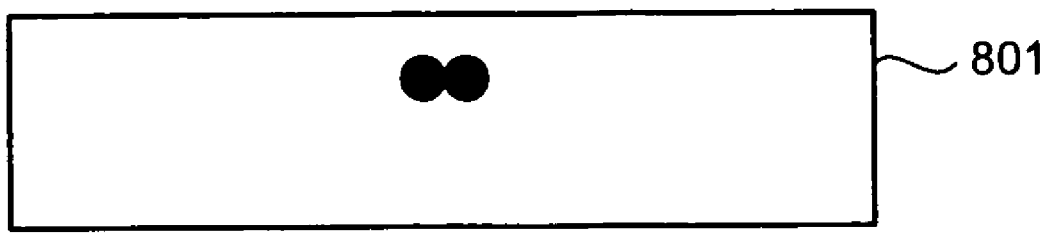
801
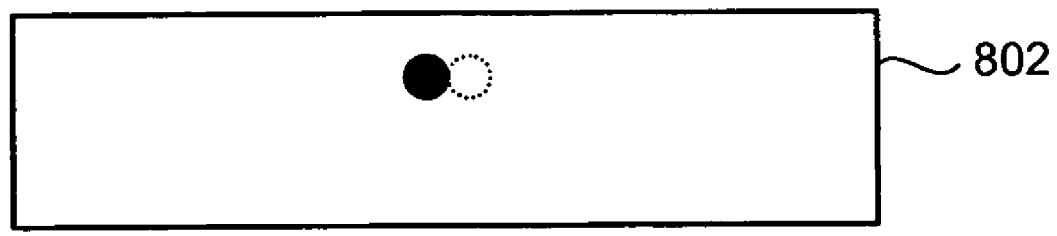
802
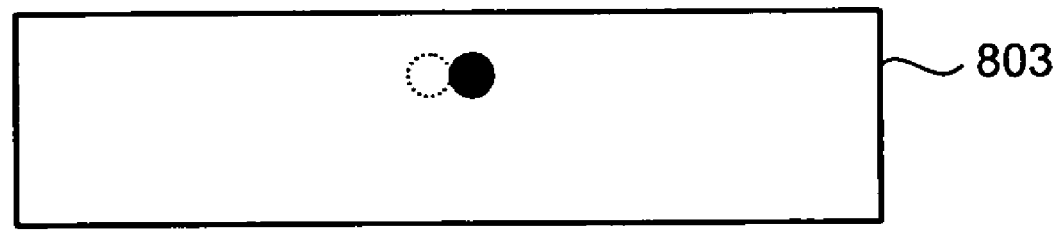
803

FIG.15

| TYPES OF RULES | RULE (GROUP) | RULE (POSITIONAL RELATIONSHIP) |
|---|---|---|
| STRIKES | TWO HORIZONTALLY ALIGNED REGIONS ADJACENT, SAME SIZE, SAME COLOR | VERTICAL ARRANGEMENT: SAME X COORDINATE AS BALLS AND OUTS HORIZONTAL ARRANGEMENT: SAME Y COORDINATE AS BALLS AND OUTS |
| BALLS | THREE HORIZONTALLY ALIGNED REGIONS ADJACENT, SAME SIZE, SAME COLOR | VERTICAL ARRANGEMENT: SAME X COORDINATE AS STRIKES AND OUTS HORIZONTAL ARRANGEMENT: SAME Y COORDINATE AS STRIKES AND OUTS |
| OUTS | TWO HORIZONTALLY ALIGNED REGIONS ADJACENT, SAME SIZE, SAME COLOR | VERTICAL ARRANGEMENT: SAME X COORDINATE AS STRIKES AND BALLS Y COORDINATE LOWER THAN STRIKES HORIZONTAL ARRANGEMENT: SAME Y COORDINATE AS STRIKES AND BALLS |
| INNING + TOP/BOTTOM | TWO HORIZONTALLY ALIGNED REGIONS IN VICINITY, SAME SIZE, SAME COLOR, DIGITS + CHARACTERS | TO LEFT OF OR ABOVE SCORE REGION |
| SCORE | TWO HORIZONTALLY ALIGNED REGIONS IN VICINITY, SAME SIZE, SAME COLOR, DIGITS | TO LEFT OF OR ABOVE SCORE REGION TO RIGHT OF OR BELOW INNING |
| ON-BASE | THREE REGIONS AT CORNERS OF RHOMBUS IN VICINITY, SAME SIZE, SAME COLOR, DIGITS | |

FIG.16

| TIME | INNING | TOP/BOTTOM | STRIKE | BALL | OUT | ON-BASE | SCORE |
|---|---|---|---|---|---|---|---|
| 0:41:11 | 5 | TOP | 0 | 2 | 1 | 1 | 2 – 3 |
| 0:42:12 | 5 | TOP | 1 | 2 | 1 | 1 | 2 – 3 |
| 0:43:15 | 5 | TOP | 1 | 3 | 1 | 1 | 2 – 3 | ~1001
| 0:44:47 | 5 | TOP | 0 | 0 | 1 | 1, 2 | 2 – 3 | ~1002
| 0:45:20 | 5 | TOP | 1 | 0 | 1 | 1, 2 | 2 – 3 |
| 0:46:07 | 5 | TOP | 1 | 1 | 1 | 1, 2 | 2 – 3 |
| 0:46:52 | 5 | TOP | 2 | 1 | 1 | 1, 2 | 2 – 3 |
| 0:47:28 | 5 | TOP | 2 | 2 | 1 | 1, 2 | 2 – 3 |
| 0:48:15 | 5 | TOP | 0 | 0 | 2 | 1, 2 | 2 – 3 |
| 0:49:05 | 5 | TOP | 1 | 0 | 2 | 1, 2 | 2 – 3 |
| 0:50:32 | 5 | TOP | 1 | 1 | 2 | 1, 2 | 2 – 3 |
| 0:53:19 | 5 | BOTTOM | 0 | 0 | 0 | – | 2 – 3 |
| 0:53:57 | 5 | BOTTOM | 1 | 0 | 0 | – | 2 – 3 |
| 0:54:29 | 5 | BOTTOM | 1 | 1 | 0 | – | 2 – 3 | ~1005
| 0:54:16 | 5 | BOTTOM | 1 | 2 | 0 | – | 2 – 3 |
| 0:56:23 | 5 | BOTTOM | 0 | 0 | 0 | 1 | 2 – 3 |
| 0:57:15 | 5 | BOTTOM | 0 | 1 | 0 | 1 | 2 – 3 |
| 0:58:01 | 5 | BOTTOM | 0 | 2 | 0 | 1 | 2 – 3 | ~1003
| 1:01:59 | 5 | BOTTOM | 0 | 0 | 0 | – | 2 – 5 | ~1004
| 1:02:17 | 5 | BOTTOM | 0 | 1 | 0 | – | 2 – 5 |
| 1:02:52 | 5 | BOTTOM | 1 | 1 | 0 | – | 2 – 5 |
| 1:02:28 | 5 | BOTTOM | 2 | 1 | 0 | – | 2 – 5 |
| 1:03:12 | 5 | BOTTOM | 0 | 0 | 1 | – | 2 – 5 |

FIG. 18
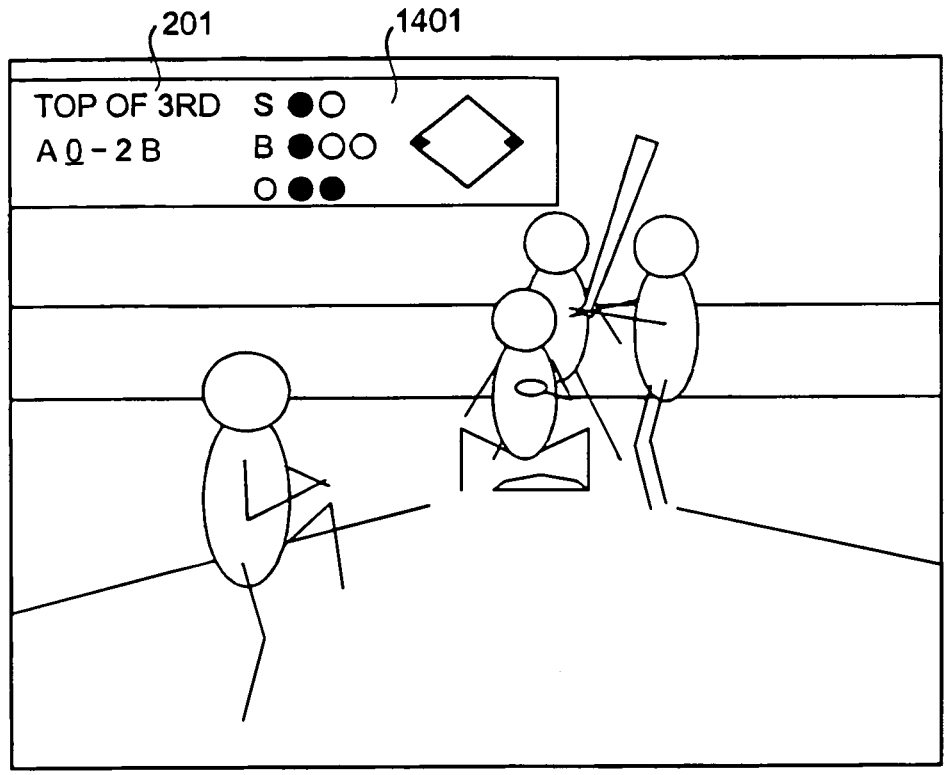
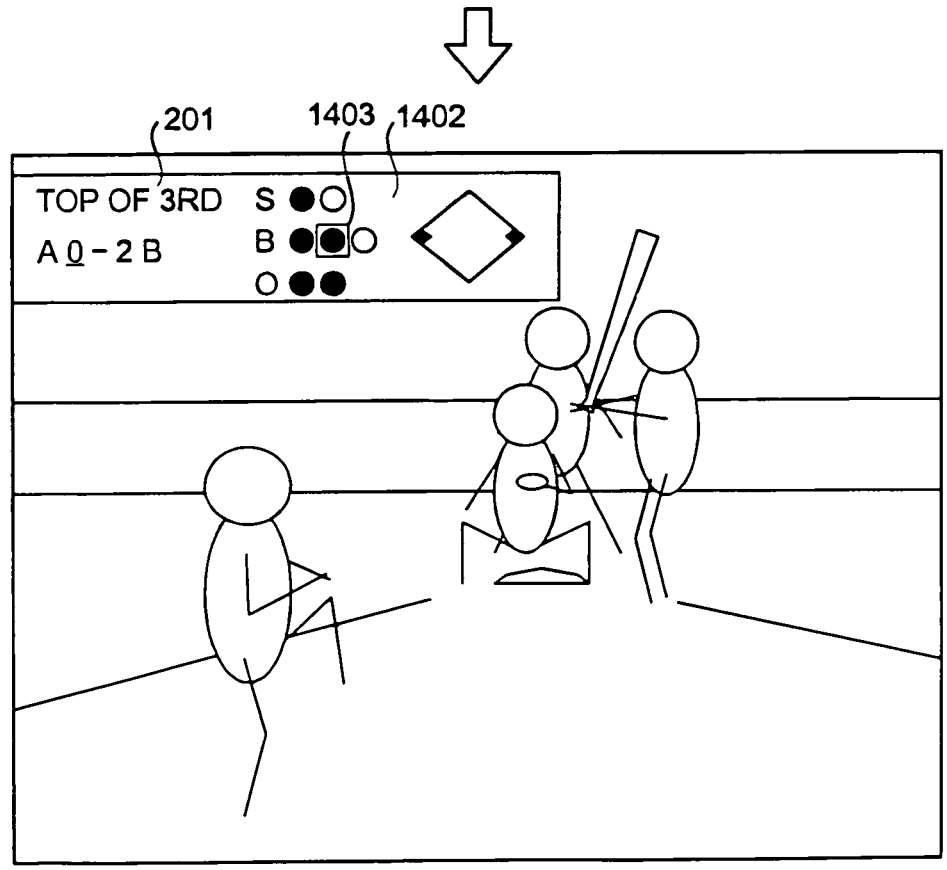

VIDEO-ATTRIBUTE-INFORMATION OUTPUT APPARATUS, VIDEO DIGEST FORMING APPARATUS, COMPUTER PROGRAM PRODUCT, AND VIDEO-ATTRIBUTE-INFORMATION OUTPUT METHOD

CROSS-REFERENCE TO RELATED APPLICATIONS

This application is based upon and claims the benefit of priority from the prior Japanese Patent Application No. 2007-008909, filed on Jan. 18, 2007; the entire contents of which are incorporated herein by reference.

BACKGROUND OF THE INVENTION

1. Field of the Invention

The present invention relates to a video-attribute-information output apparatus, a video digest forming apparatus, a computer program product, and a video-attribute-information output method.

2. Description of the Related Art

With the recent advancement of the information infrastructure of multi-channel broadcasting, a large amount of video contents has been distributed. On the video recorder side, because the widespread use of hard disk recorders and personal computers equipped with a tuner enables video contents to be recorded as digital data, the contents can be viewed in various manners.

The manners of viewing on a video recorder include a video digest technique, with which a long video program can be shortened into digest form. For instance, JP-A 2005-109566 (KOKAI) describes a method of making a digest of a sports commentary program, with which scenes are extracted from a metadata-added video picture in accordance with the user's preference, thereby obtaining a digest. The metadata may be input as events of individual players' plays in the game, together with time information thereof, and the metadata needs to be manually input while referring to the video picture.

JP-A 2000-132563 (KOKAI) describes a method of assisting in metadata inputting. In particular, an image region for displaying information such as the inning and score (score information area) in a baseball game broadcast is designated and entered as a key image. When it is determined that a rate of change in the key image exceeds a certain standard level upon an event such as the end of inning, the image of this moment is displayed.

According to the method of JP-A 2005-109566 (KOKAI), however, while the use of metadata necessary for digest formation has improved the accuracy of the summary, a problem of labor and costs arises because all the metadata has to be manually input.

The technique of JP-A 2000-132563 (KOKAI) may save some of the labor of inputting metadata for a baseball game broadcast.

However, with the technique of JP-A 2000-132563 (KOKAI), the image region for displaying inning and score information still needs to be manually designated, and images detected as events also have to be manually read in. Thus, the problem of labor for the manual designation of an image region for each program and labor and costs for the manual input of detected innings and scores is yet to be solved.

SUMMARY OF THE INVENTION

According to one aspect of the present invention, a video-attribute-information output apparatus includes a scene dividing unit that detects a change in scenes where there is little similarity between frames of a video content, and divides the video content into a plurality of scenes; an attribute-information-area extracting unit that extracts an attribute information area in which attribute information is displayed and which has no change between specific frames of adjacent scenes that are obtained by dividing by the scene dividing unit; a character-area extracting unit that extracts character areas in which video attribute information in individual characters that is metadata of the video content is present, from the attribute information area extracted by the attribute-information-area extracting unit; a character-area-meaning assigning unit that assigns meanings to the character areas extracted by the character-area extracting unit, by referring to rule information that specifies the meanings for the character areas; and a video-attribute-information output unit that reads the video attribute information from the character areas to which the meanings are assigned, and outputs the video attribute information.

According to another aspect of the present invention, a video digest forming apparatus includes the video-attribute-information output apparatus; an importance calculating unit that calculates a level of importance for each event included in the video attribute information output from the video-attribute-information output apparatus; a video segment selecting unit that selects a video segment of the video content to be included in a digest video picture in accordance with the level of importance calculated by the importance calculating unit; a description-use event selecting unit that selects a description-use event from a list of events to use in preparation of a description that is to be included in the digest video picture; a description preparing unit that prepares the description from the description-use event selected by the description-use event selecting unit; and an integrating unit that combines the selected video segment and the description, and forms digest video information that includes both of the video segment and the description.

According to still another aspect of the present invention, a video-attribute-information output method includes detecting a change in scenes where there is little similarity between frames of a video content, and dividing the video content into a plurality of scenes; extracting an attribute information area in which attribute information is displayed and which has no change between specific frames of the divided adjacent scenes; extracting character areas in which video attribute information in individual characters that is metadata of the video content is present, from the extracted attribute information area; assigning meanings to the extracted character areas by referring to rule information that specifies the meanings for the character areas; and reading the video attribute information from the character areas to which the meanings are assigned, and outputting the video attribute information.

A computer program product according to still another aspect of the present invention causes a computer to perform the method according to the present invention.

BRIEF DESCRIPTION OF THE DRAWINGS

FIG. 14 is a schematic diagram for explaining a process executed on overlapping regions;

FIG. 15 is a schematic diagram of an example of rule information;

FIG. 16 is a schematic diagram of an example of baseball score information;

FIG. 18 is a schematic diagram for explaining an example of display highlighting.

DETAILED DESCRIPTION OF THE INVENTION

A first embodiment of the present invention is explained with reference to FIGS. 1 to 16. According to the present embodiment, a personal computer is adopted for the video digest forming apparatus.

Figure 1:
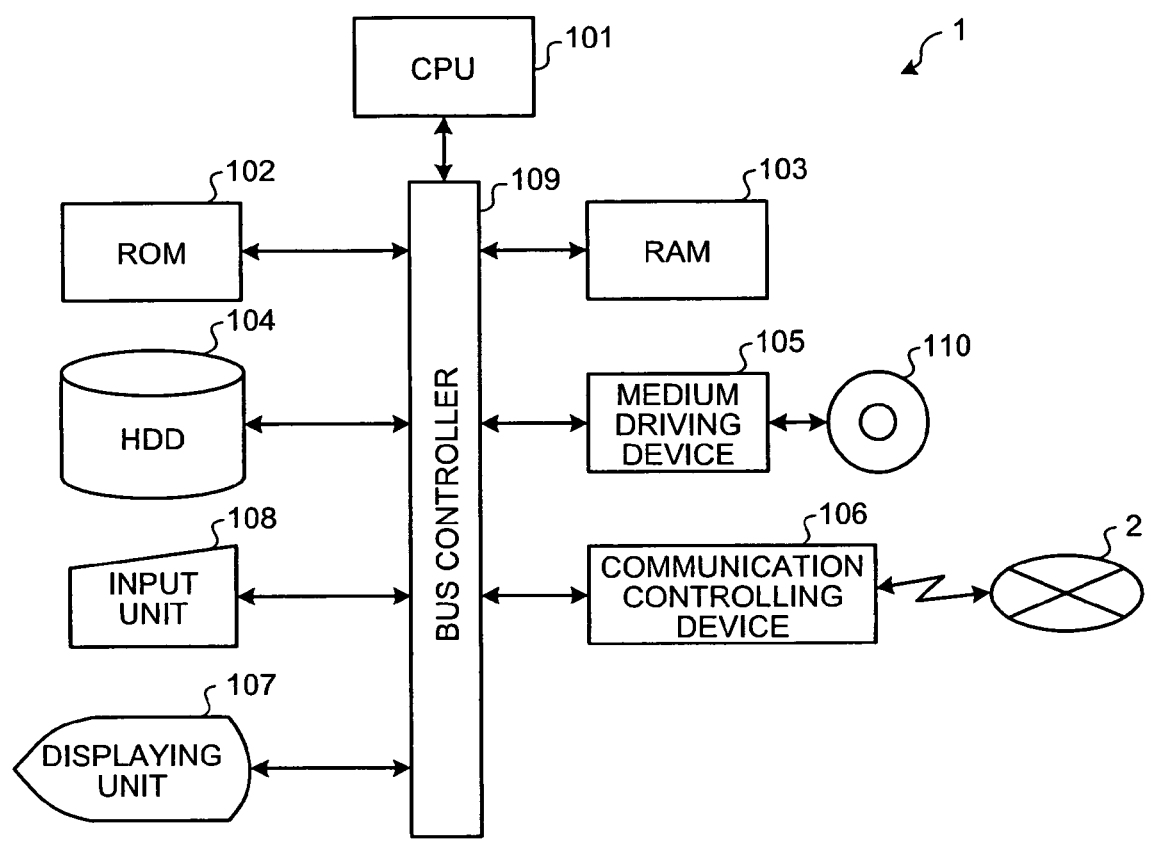
FIG. 1 is a block diagram of a structure of a video digest forming apparatus according to a first embodiment of the present invention.

FIG. 1 is a block diagram of a structure of a video digest forming apparatus 1 according to the first embodiment of the present invention. The video digest forming apparatus includes a central processing unit (CPU) 101 that executes information processing, a read only memory (ROM) 102 that stores therein a BIOS and the like, a random access memory (RAM) 103 that stores therein various kinds of data in a rewritable manner, a hard disk drive (HDD) 104 that functions as various databases and also stores therein various programs, a medium driving device 105 such as a DVD drive that retains information by use of a recording medium 110, delivers information to the outside, and acquires information from outside, a communication controlling device 106 that conducts information to other outside computers by way of a network 2 by establishing communications, a displaying unit 107 such as a liquid crystal display (LCD) that presents the progress and results of a process to the operator, an input unit 108 such as a keyboard and a mouse by which the operator inputs a command and information to the CPU 101, and the like. A bus controller 109 controls transmission and reception of data among these units to bring the video digest forming apparatus 1 into operation.

When the user turns on the video digest forming apparatus 1, the CPU 101 starts a program called a loader in the ROM 102 so that a program called an operating system (OS) that manages the computer hardware and software is read from the HDD 104 into the RAM 103 to start the OS. The OS runs programs, reads information in, and saves the information in accordance with the user's operation. Major OSs include Windows (registered trademark). An operation program that runs on an OS is called an application program. The application program does not have to be one that runs on a certain OS, but may cause the OS to execute some of the processes discussed later. Alternatively, the application program may be contained in a group of program files for certain application software or the OS.

The video digest forming apparatus 1 stores therein a video processing program as an application program in the HDD 104. From this aspect, the HDD 104 serves as a recording medium that stores therein the video processing program.

In addition, the application program installed in the HDD 104 of the video digest forming apparatus 1 is usually stored in the recording medium 110 selected from media of various systems, for example, an optical disk such as a DVD, a magnetooptical disk, a magnetic disk such as a flexible disk, and a semiconductor memory. The operation program stored in the recording medium 110 is installed in the HDD 104. For this reason, a portable recording medium 110 such as an optical information recording medium such as a DVD and a magnetic medium such as a floppy disk may also serve as a recording medium for storing the application program. In addition, the application program may be downloaded from the network 2 in the outside by way of the communication controlling device 106 to be installed in the HDD 104.

When the video processing program is initiated to operate on the OS, the CPU 101 of the video digest forming apparatus 1 executes different calculation processes in accordance with this video processing program to centrally control the units of the video digest forming apparatus 1. Among the calculation processes performed by the CPU 101 of the video digest forming apparatus 1, the processes characteristic to the present embodiment are explained below.

Figure 2:
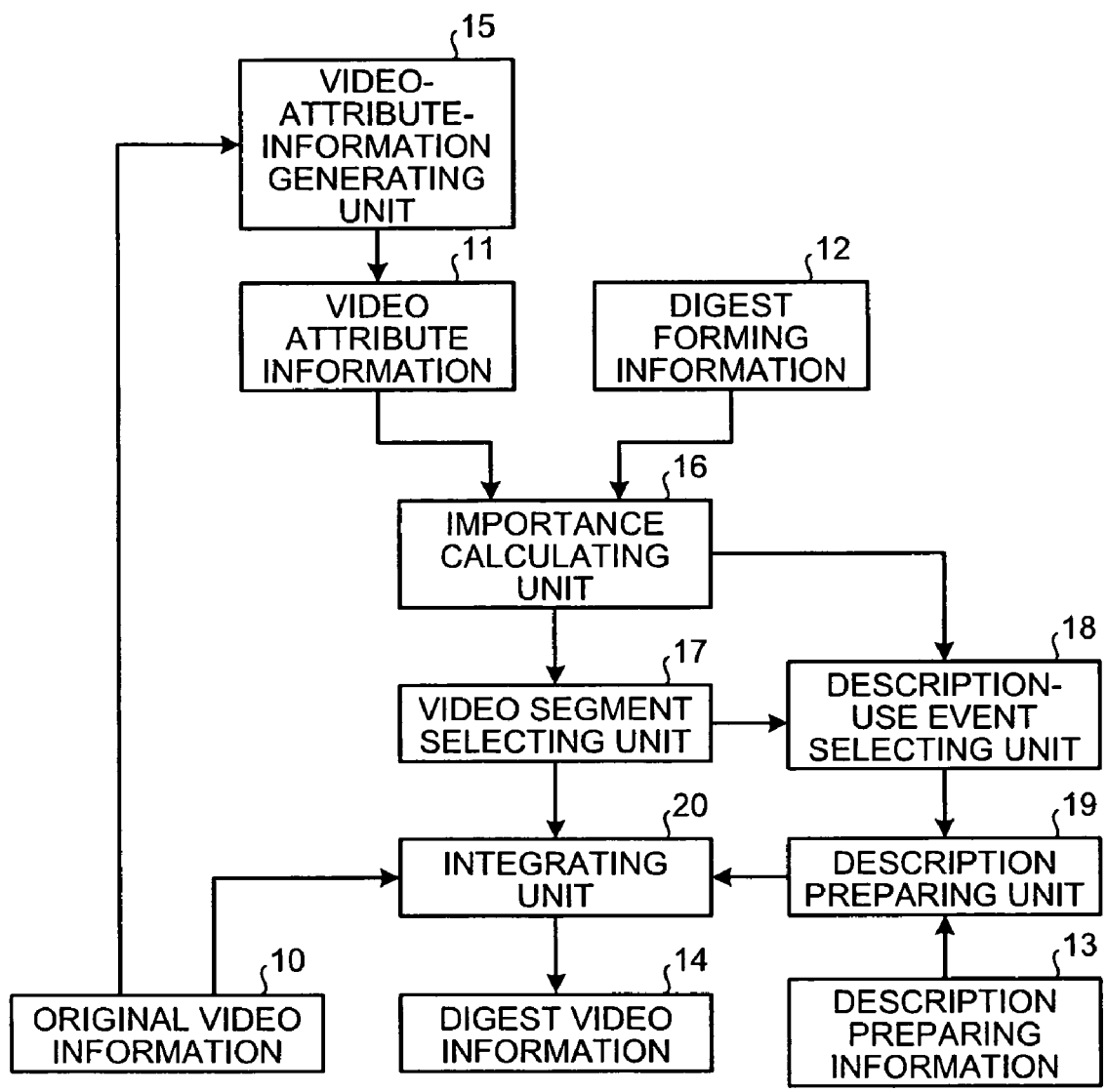
FIG. 2 is a block diagram for showing an overview of the structure of the video digest forming apparatus.

FIG. 2 is a block diagram for showing an overview of the structure of the video digest forming apparatus 1. As shown in FIG. 2, by executing the video processing program, the video digest forming apparatus 1 realizes a video-attribute-information generating unit 15, which is a video-attribute-information output device, an importance calculating unit 16, a video segment selecting unit 17, an description-use event selecting unit 18, an description preparing unit 19, and an integrating unit 20. The numeral 10 denotes original video information, 11 is video attribute information, 12 is digest forming information, 13 is description preparing information, and 14 is digest video information.

The original video information 10 can be various video contents such as TV programs and video pictures shot by the user. According to the embodiment, the original video information 10 is assumed to be digital data. The digital data can be of any format (in general, a compressed data format such as MPEG-1 and MPEG-2). The source video can also be analog data. If this is the case, the data must be converted into digital data outside the video digest forming apparatus 1 in advance, or the video digest forming apparatus 1 must be provided with an analog/digital converting function. The video content may be of one kind or more. Any video content can be played back from any position in response to an input of identification information, such as a title and an ID, of the video contents and also either playback start time or frame number.

The video attribute information 11 can be various kinds of attribute information (metadata) relating to a video content. The video attribute information 11 includes a list of events in which any incidents that occur in a video content are listed as events. As an event, information on the name of a person or an object and the action thereof (in a baseball game, for example, "player X's home-run") and a breakpoint in time (such as "play ball" and "end of game") is described together with the occurrence time of the event. The occurrence time may be described as the beginning and end of a segment in a similar manner to the scene information, or as the time of the moment at which the event occurs. The attribute information may also include information that is not particularly related to the time of the video contents such as a type of sport, the name of the opponent team, date and time, place, names of players, and the result of the game. A sport game is employed here as an example, but the attribute information can be described suitably in accordance with the contents. For instance, the attribute information for a drama or an informational program can be described in a similar manner by incorporating characters of the drama or topics of the program.

The digest forming information 12 includes the user's preference in forming a digest, the length of the digest video picture, and parameters of the digest algorithm. The user's preference indicates information such as keywords for finding a portion on which the user places higher priority to view. In a sport game, favorite teams and players may serve as the keywords. The keywords may be subjects that the user desires to view only, or subjects that the user does not desire to view in addition to subjects that the user desires to view. The information may be directly input, or may be stored in an internal or external memory device so that it saves the user the labor of inputting the same conditions every time.

The description preparing information 13 indicates information including a template for preparing a description from an event in the video attribute information 11. The template is a character string obtained by a combination of fixed character strings and variable character strings, such as "at (time), chance for (team). (player)'s play!", where the character strings in parentheses as in "(time)" show variable strings.

The digest video information 14 indicates a digest video picture prepared by the video digest forming apparatus 1. The digest video information 14 includes part of the original video content and the prepared descriptions (such as captions and narrations) of visible information using characters or the like and audible information using voices or the like. A content prepared separately from the original video content (such as a title frame) may also be included. The digest video information 14 may be in a format in which the information can be reproduced as a video content independently from the original video content, or in a format in which the information is reproduced by displaying and reproducing a description by use of the characters and voices while referring to the original video content. In the latter case, a description language such as SMIL by which multimedia can be displayed in synchronization may be adopted. The voices may be reproduced by incorporating a voice synthesizing technique.

The components of the video digest forming apparatus 1 are explained below.

The video-attribute-information generating unit 15 automatically generates the video attribute information 11 based on the original video information 10. The process of automatically generating the video attribute information 11 at the video-attribute-information generating unit 15 will be described later in detail.

The importance calculating unit 16 calculates the level of importance for each event included in the video attribute information 11 from the video attribute information 11 and digest forming information 12 that is input therein. The level of importance of an event is obtained by calculating a evaluation score indicating how much of the character strings included in the event match the keywords included in the digest forming information 12. For instance, the level of importance can be obtained from the following equation (1), where the level of importance is w, and the total number of keywords is N. In the equation (1), $a_k$ denotes a parameter showing the weight of the kth keyword in the digest forming information 12.

$$w = S a_k M(x) \tag{1}$$

Here, the range of the total sum S is k=1 to N. When the xth keyword has a match, M(x)=1, while when the xth keyword has no match, M(x)=0.

In the structure where a keyword may indicate what the user does not wish to view, M(x)=1 when the xth keyword has a match and the xth keyword is related to a desired picture. On the other hand, M(x)=−1 when the xth keyword has a match but the xth keyword is related to an undesired picture. When there is no match, M(x)=0.

The video segment selecting unit 17 selects a segment of the original content that is to be included in the digest video picture, in accordance with the calculated level of importance.

The description-use event selecting unit 18 selects an event for preparing descriptions (such as captions and narrations) having characters or voices to be incorporated in the digest video picture, from the list of events. In this selection, a predetermined event may be automatically selected, or an event may be selected explicitly by the user. For instance, events such as hits are selected for a baseball game broadcast. In principle, there are four different possible processes, a process of preparing a description only for the entire digest video picture, a process of preparing descriptions only for a certain portion of the digest video picture, a process of preparing descriptions for the entire or part of the digest video picture and a specific portion that is not included in the digest video picture, and a process of preparing a description only for a specific portion that is not included in the digest video picture. These event selecting processes may be executed separately from the video segment selecting unit 17, or executed by use of the data acquired from the video segment selecting unit 17.

The description preparing unit 19 prepares a description (incorporating visible information including characters or audible information including voices) from the description-use event selected by the description-use event selecting unit 18 and also from the description preparing information 13. As discussed before, the description preparing information 13 includes templates for preparing descriptions. A template is a character string determined by a combination of fixed character strings and variable character strings such as "at (time), chance for (team). (player)'s play!" where the character strings in parentheses as in "(time)" are variable. Character strings that are obtained directly or indirectly from the video attribute information 11 and the digest forming information 12 can fill in the variable strings. Multiple templates are prepared in advance in accordance with types of events and the like.

The integrating unit 20 integrates the video segment information and the description using a caption of characters or voice narration into the digest video information 14 having both information items. The timing of displaying characters and initiating an utterance is controlled to correspond with the event occurrence time and video segments. When the timing is to bring into correspondence with the occurrence time, an appropriate time interval may be set before the occurrence time to start a display or an utterance, or the timing of the display and utterance may be adjusted so that a certain point of the utterance segment (midpoint, for example) falls onto the occurrence time of the event. When the timing is to bring into correspondence with the video segment, the display or utterance may be made by setting an appropriate time interval from the beginning or end point of the segment. A combination of these techniques can be certainly employed, for example by bringing the caption of characters into correspondence with the video segment while bringing the voice narration into correspondence with the occurrence time.

In the integration process, the caption or the narration may be contained in the digest video by preparing a caption in a manner to be overlaid when displayed or preparing a voice narration by voice synthesis. Alternatively, the caption and the narration may be prepared in a text form as the digest video information 14, and the overlay display and voice synthesis may be executed on the reproducing device.

In the above example, the integrating unit 20 simply combines the selected video segment information and the generated description information to output one piece of digest video information 14. However, the video segment and volume may be adjusted in this process.

According to the present embodiment, the video digest forming apparatus 1 selects a video segment that the user is interested in from the video information, in accordance with the keywords input by the user, the conditions such as time, and the user's preference, thereby forming a digest video picture to which a caption or voice narration is added. In addition, because the description is provided to make up for omitted important scenes, a digest video picture that is clearly understandable can be prepared.

Hence, the video digest forming apparatus 1 according to the present embodiment allows the user to obtain and view a digest that includes portions of the user's interest only, without playing back the whole program. A portion that does not appear in the video picture may be included in the description incorporating captions and voice narrations, and the user can view such a video picture with the style of writing and tone of voice that suits the user's preference.

Figure 3:
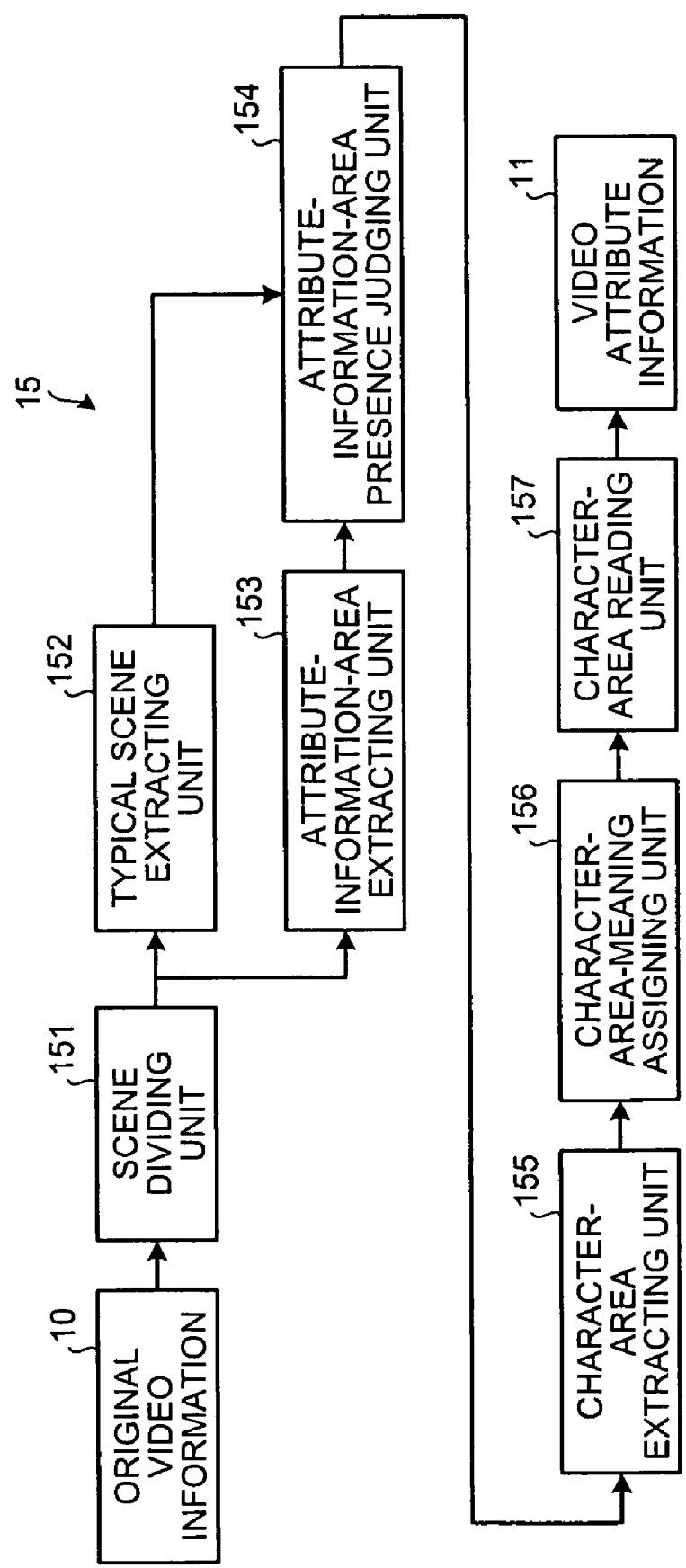
FIG. 3 is a block diagram for showing an overview of the structure of a video-attribute-information generating unit.
Figure 4:
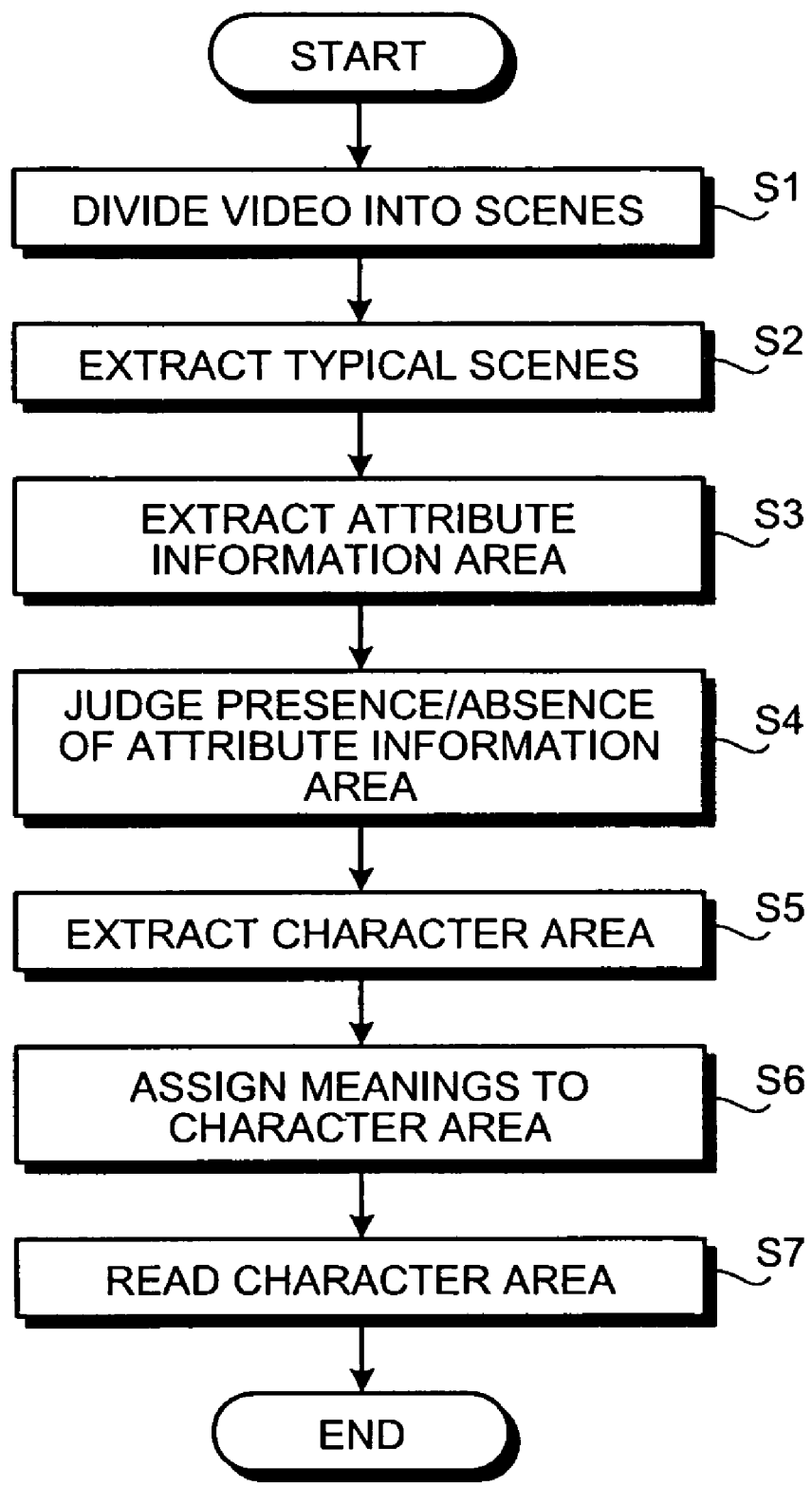
FIG. 4 is a flowchart for briefly showing a process of automatically generating video-attribute-information.

The process of automatically generating the video attribute information 11 at the video-attribute-information generating unit 15 is explained in detail below. FIG. 3 is a block diagram for showing an overview of the structure of the video-attribute-information generating unit 15, and FIG. 4 is a flowchart for briefly showing the process of automatically generating the video attribute information.

As shown in FIG. 3, the video-attribute-information generating unit 15 receives the original video information 10, and outputs the video attribute information 11. The video-attribute-information generating unit 15 includes a scene dividing unit 151 that serves as a means for dividing the original video information 10 into scenes, a typical scene extracting unit 152 that serves as a means for extracting images (typical scenes) shot in the same composition, an attribute-information-area extracting unit 153 that serves as a means for extracting an attribute information area, an attribute-information-area presence judging unit 154 that serves as a means for judging whether an attribute information area is present in a typical scene, a character-area extracting unit 155 that serves as a means for extracting a character area containing the attribute information area, a character-area-meaning assigning unit 156 that serves as a means for assigning meaning to the character area, and a character-area reading unit 157 that serves as a means for reading video attribute information from the character area and outputting the video attribute information.

The overview of the process of automatically generating the video attribute information is now described. The steps of the process will be discussed later in detail. As shown in FIG. 4, first, a feature is calculated for each frame of the original video information 10, and the original video information 10 is divided into scenes in accordance with sets of sequential frames whose features are similar (by the scene dividing unit 151 at step S1). In particular, the original video information 10 is divided into scenes by detecting scene changes that show little similarity between any adjacent frames of the original video information 10.

Next, typical scenes are extracted from the scenes (by the typical scene extracting unit 152 at step S2). An attribute information area in which the attribute information is displayed is extracted from the screen of each of the typical scenes (by the attribute-information-area extracting unit 153 at step S3). Whether any attribute information is displayed in each of the typical scenes extracted at step S2 is determined (by the attribute-information-area presence judging unit 154 at step S4).

Thereafter, a character area is extracted from the typical scenes in which the attribute information is displayed (by the character-area extracting unit 155 at step S5), and meaning is assigned to the extracted character area by comparing the character-area with rule information (by the character-area-meaning assigning unit 156 at step S6).

Finally, the character area is read to generate the video attribute information (by the character-area reading unit 157 at step S7), and the process is terminated.

Now, the above used terms are explained with reference to the drawings.

Figure 5:
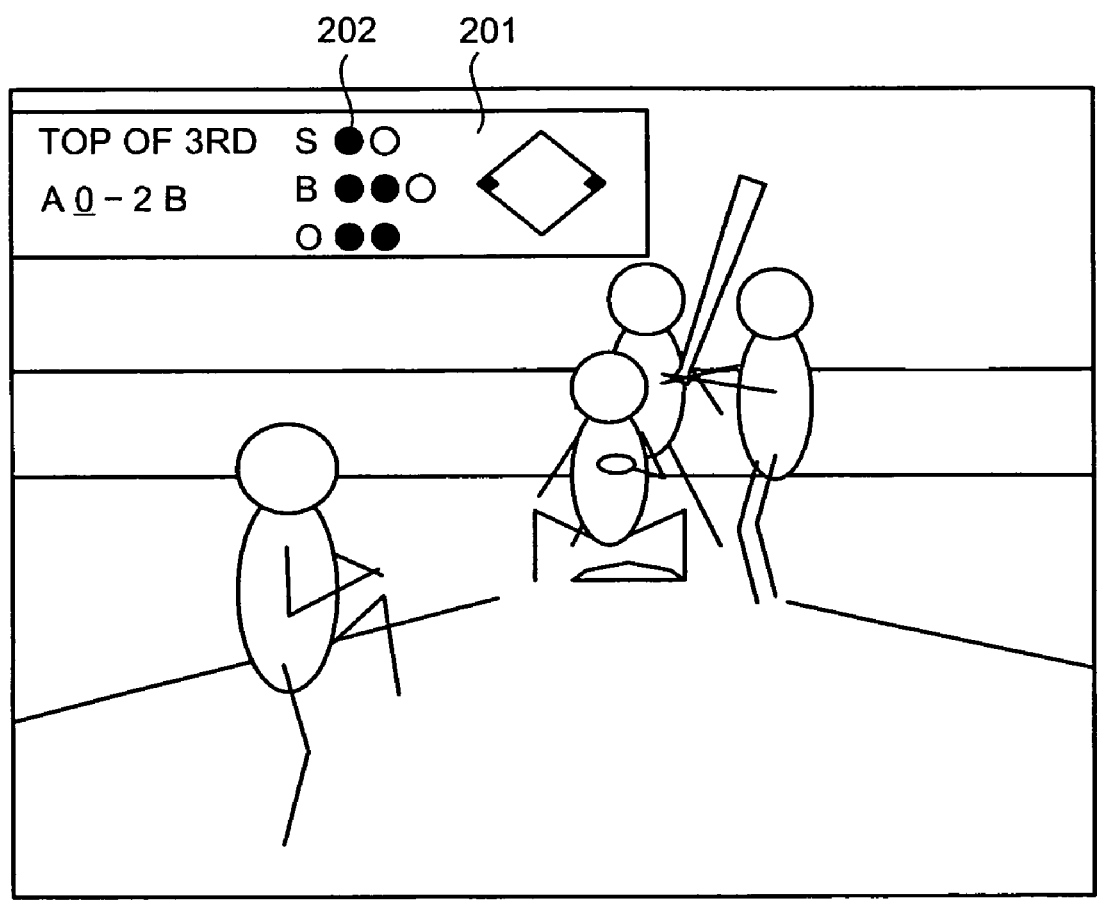
FIG. 5 is a schematic diagram for showing an example of a screen of a baseball game broadcast.

FIG. 5 is a schematic diagram for showing an example of a screen of a baseball game broadcast. As shown in FIG. 5, the area denoted as the numeral 201 shows "inning", "score", "count", and "runners on base". These score information items are referred to as attribute information, and the area 201 is referred to as an attribute information area. In addition, each area in the attribute information area where individual characters are displayed (for instance, a score region for the count, denoted as 202) is referred to as a character area.

Figure 6:
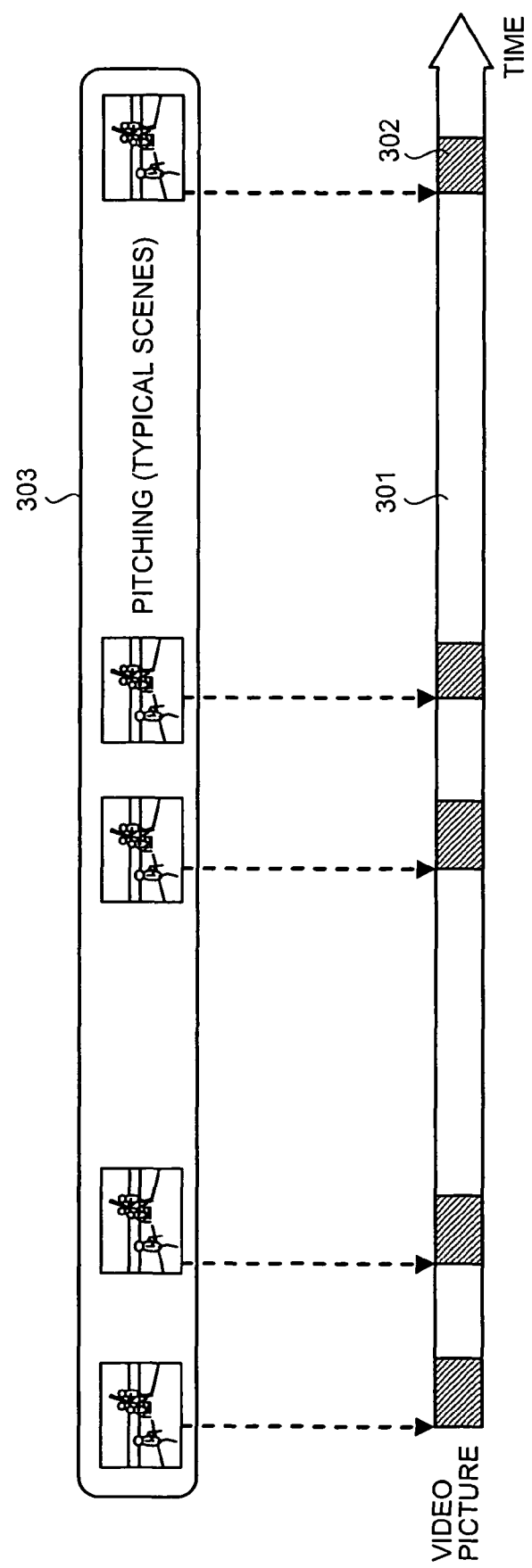
FIG. 6 is a diagram for explaining a typical scene.

FIG. 6 is a diagram for explaining images shot in the same composition, which serve as typical scenes. The numeral 301 denotes the original video information 10. Time flows in a direction to the right on the drawing sheet. The shaded areas (such as 302) show pitching scenes. The pitching scene is shot from the back of a pitcher toward a batter, as illustrated in FIG. 5. In a baseball game broadcast, the screen is switched to the picture as shown in FIG. 5 every time a ball is pitched, with the position and orientation of the camera staying almost the same. Therefore, a pitching scene repeatedly appears in a baseball game broadcast, as indicated as 303. Images that are shot in the same composition and repeatedly appear in a video content are defined as typical scenes.

Next, the process at each step is explained in detail.

Figure 7:
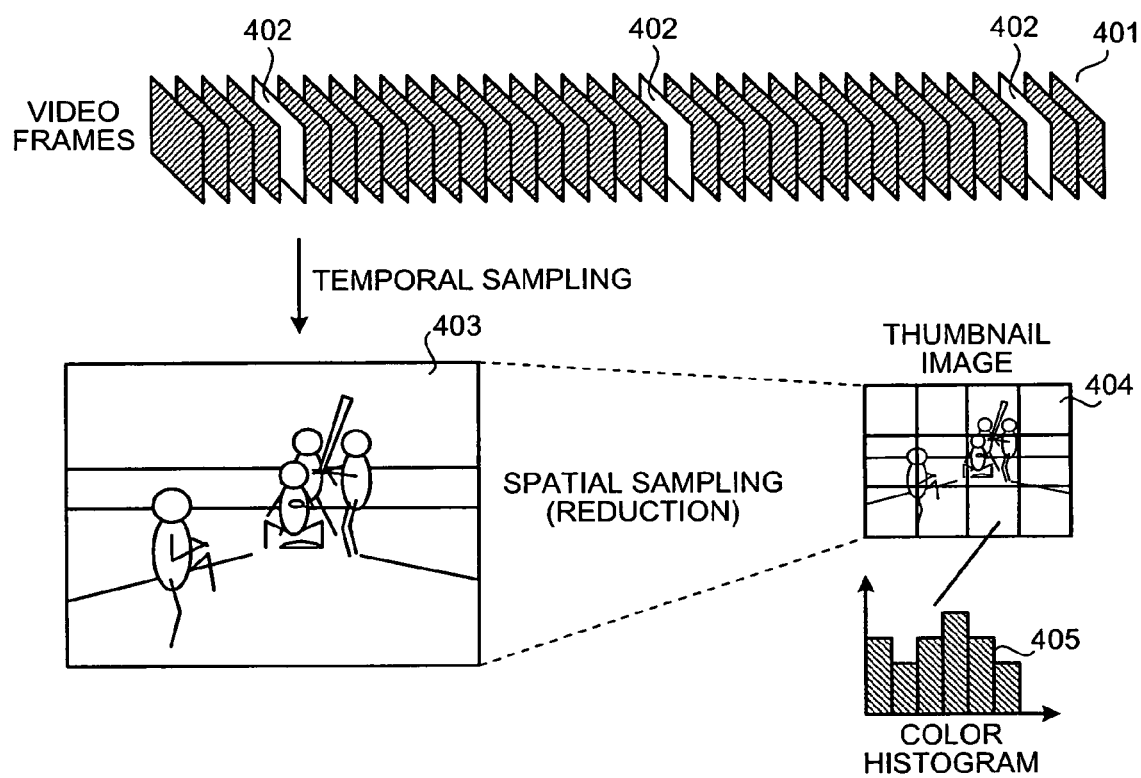
FIG. 7 is a schematic diagram for explaining a method of extracting a feature from an input video picture.

The scene dividing process by the scene dividing unit 151 (at step S1) is explained first. The scene dividing unit 151 performs scene division by comparing the features of the video frames of the original video information 10. FIG. 7 is a schematic diagram for explaining a method of extracting a feature from an input video picture. The numeral 401 denotes video frames of the original video information 10 placed in order. The features can be extracted directly from the video frames. According to the present embodiment, however, the method of extracting features while reducing the processing amount by taking samples in a temporal and spatial manner is dealt with.

In a temporal sampling, some frames 402 are picked and processed from a group of video frames 401, as shown in FIG. 7. The frame may be picked up in certain intervals, or only I-pictures may be picked up from MPEG frames. The frame 403 is one of the picked up frames. Then, the picked up frame 403 is reduced to create a thumbnail image 404, which is subjected to the spatial sampling. The thumbnail image 404 may be created by finding an average value of pixels to reduce the size, or by decoding only DC components of the DCT coefficients of the MPEG I-picture. Then, the thumbnail image 404 is divided into blocks, and a color histogram 405 is obtained for each block. This color histogram is determined as the feature of this frame.

Then, the distance between the features of the adjacent frames 403 is figured out, and the scene division is performed between the frames 403 where the distance of the features exceeds a certain standard value, or in other words, where there is little similarity therebetween. A Euclidean distance may be used for the distance of the features. The Euclidean distance d between the frame i and the frame i+1 can be expressed as the following equation (2), where in the histogram for the ath block of the frame i, the frequency of the bth color is $h_i(a, b)$.

$$d^2 = \sum_a \sum_b (h_i(a, b) - h_{i+1}(a, b))^2 \qquad (2)$$

Figure 8:
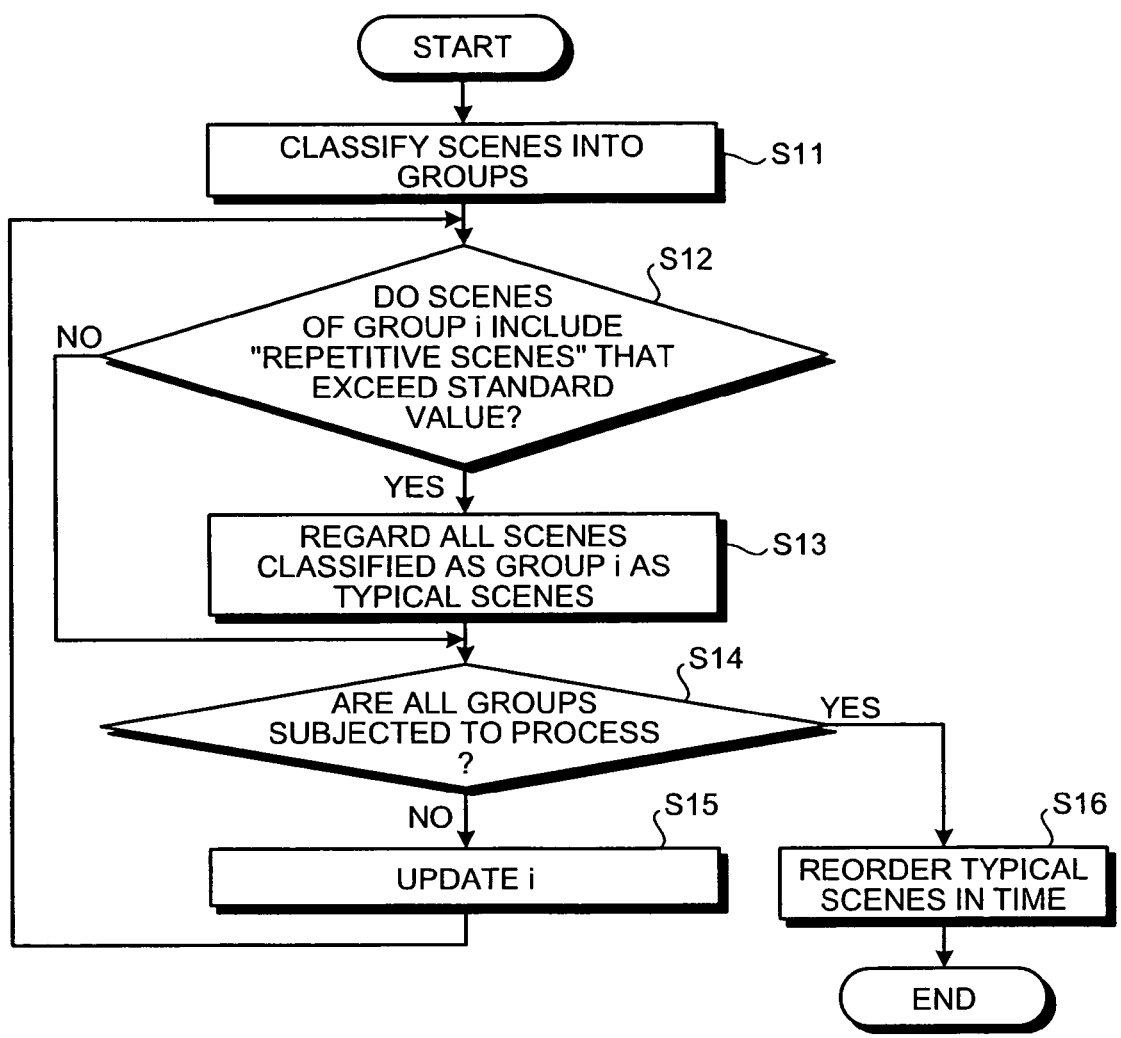
FIG. 8 is a flowchart of a typical scene extracting process.

The process of extracting typical scenes by the typical scene extracting unit 152 (at step S2) is now explained. FIG. 8 is a flowchart of a typical scene extracting process. As shown in FIG. 8, first, scenes are classified into groups in accordance with similarities based on the features of individual scenes grouped by the scene dividing unit 151 (by the classifying means at step S11). In other words, one group contains only scenes that are similar to one another. The feature of the top frame of each scene may be used as the feature of a scene.

At step S12, whether "repetitive scenes" that exceed a standard value are included in the scenes of Group i (i=1, 2, 3, ... N (initial value of i=1)) is determined. N denotes the total number of groups. The "repetitive scenes" are images that are shot in the same composition and repeatedly appear in the time series of the video picture. The determination may be made by checking whether the number of "repetitive scenes" in a group exceeds a predetermined threshold value, or whether the total hours of "repetitive scenes" in a group make up a certain percentage or more of the length of the original video picture.

When it is determined that "repetitive scenes" that exceed a standard value are included, or in other words, that the standard value is measured up (yes at step S12), all the scenes classified as Group i are regarded as typical scene at step S13. The function of the determining means is thereby achieved. Then, the system proceeds to step S14.

On the other hand, when "repetitive scenes" that exceed a standard value are not included (no at step S12), the system proceeds directly to step S14.

At step S14, whether all the groups have been subjected to the process, or in other words, whether i=N is determined. If there is any group yet to be subjected to the process (no at step S14), the value i is updated (at step S15), and the system returns to step S12. If all the groups have been subjected to the process (yes at step S14), the selected typical scenes are reordered in time (at step S16), and the process is terminated.

Figure 9:
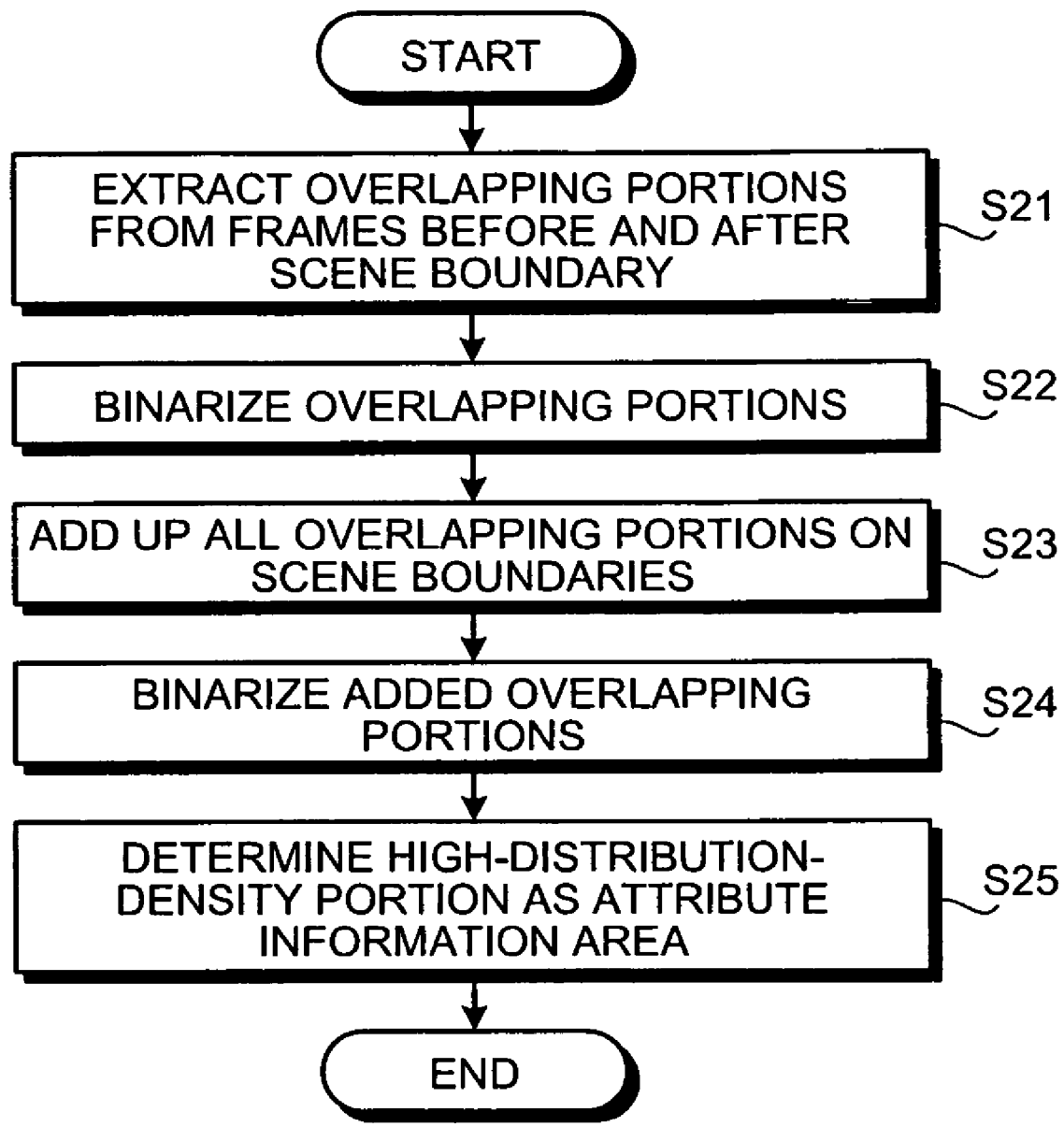
FIG. 9 is a flowchart of an attribute-information-area extracting process.

The process of extracting an attribute information area by the attribute-information-area extracting unit 153 (at step S3) is explained next. FIG. 9 is a flowchart of an attribute-information-area extracting process. As shown in FIG. 9, first, the frames before and after the boundary drawn by the scene dividing unit 151 for scene division are selected, and an overlapping portion of the frames is extracted (at step S21). The selected frames do not have to be the ones immediately before or after the boundary, but frames positioned several frames or several seconds away from the boundary may be selected. All the scene boundaries in the video picture may be subjected to the process, or only the boundaries between the typical scenes and the scenes immediately before may be subjected to the process. This is because the typical scenes (such as pitching scenes) indicate the beginning of a play, and thus attribute information (score information) is often displayed thereon. Therefore, the typical scenes are suitable for detection of an attribute information area.

Figure 10:
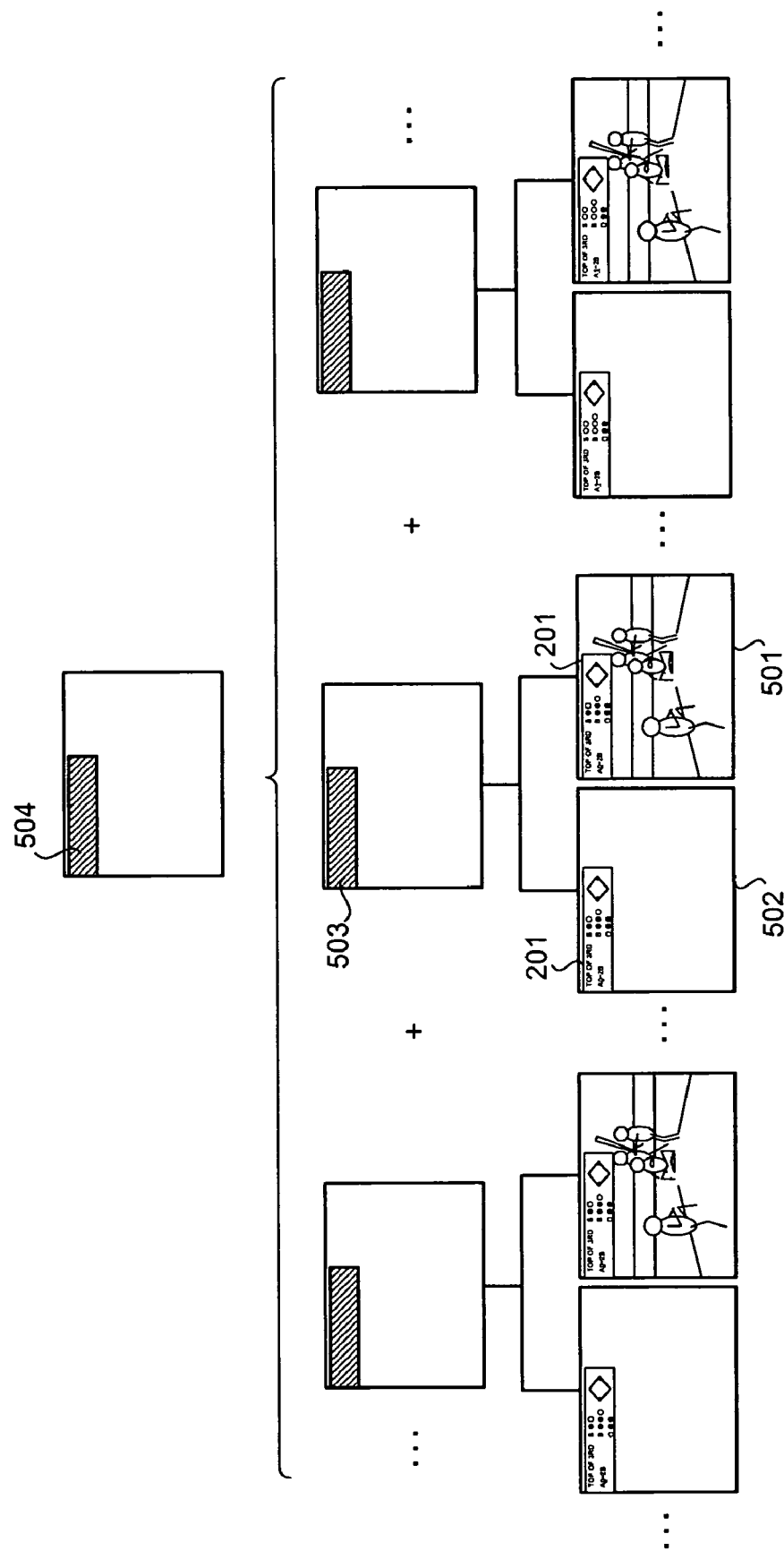
FIG. 10 is a schematic diagram for explaining a process of extracting overlapping portions among frames.

FIG. 10 is a schematic diagram for explaining a process of extracting overlapping portions among frames by use of typical scenes. As shown in FIG. 10, the numeral 501 denotes a frame near the beginning of one of the typical scenes, while 502 denotes a frame toward the end of the scene immediately before the typical scene. In other words, at step S21, an overlapping portion of the frame 501 near the beginning of one of the typical scenes and the frame 502 near the end of the scene immediately before are extracted as unchanged portions. In FIG. 10, the shaded overlapping portion 503 is extracted as an unchanged portion.

Next, pixels in the extracted overlapping portion that fall below a threshold value are obtained by binarization (at step S22).

Then, the overlapping portions extracted from all the scenes on the boundaries are added up (at step S23), and pixels in the added overlapping portion (504 in FIG. 10) that fall below a threshold value are obtained by binarization (at step S24).

Figure 11:
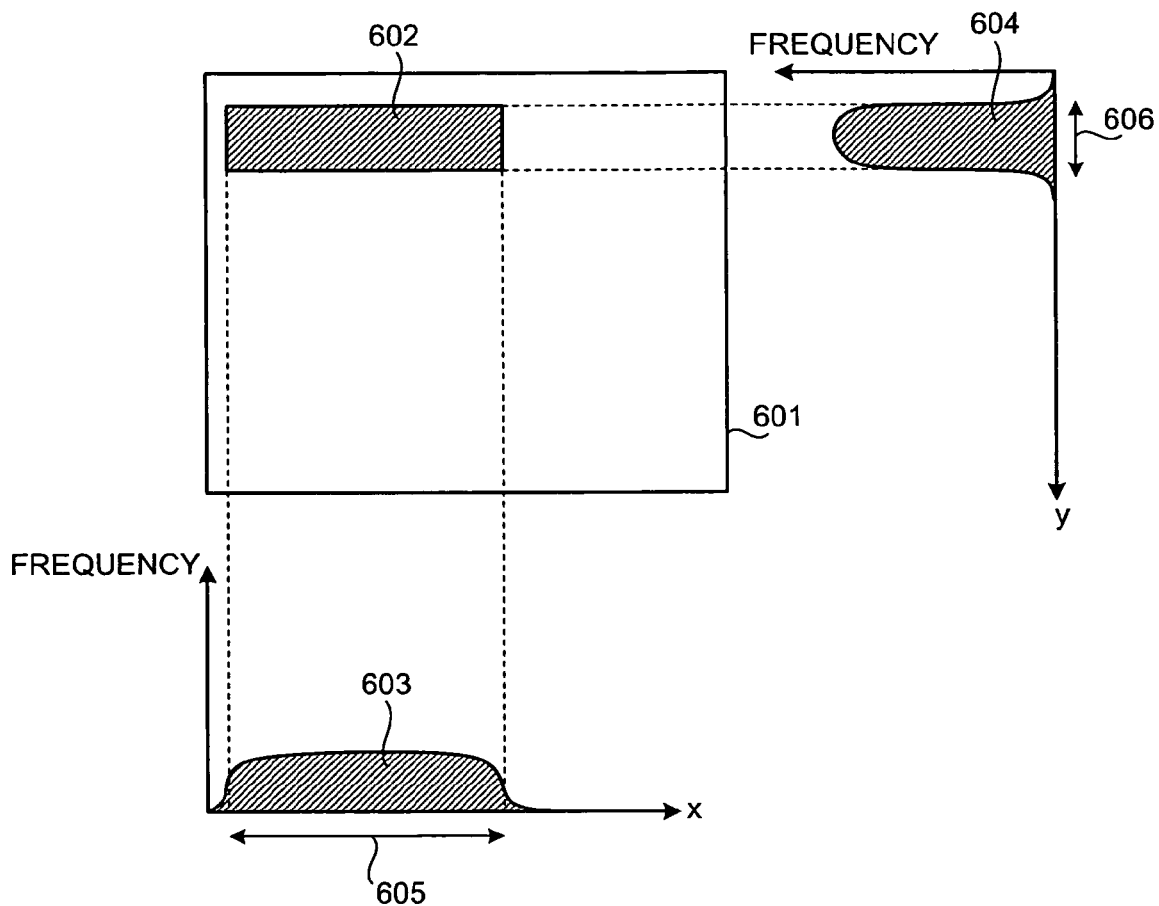
FIG. 11 is a schematic diagram for explaining a process of extracting an attribute information area.

Finally, a portion having such pixels in high distribution density is extracted as an attribute information area (at step S25). FIG. 11 is a schematic diagram for explaining a method of extracting an attribute information area. An area 602 is a candidate for the attribute information area in a screen 601, and the position of the area 602 is found out. Histograms having distributions as indicated by 603 and 604 are formed by projecting the screen 601 in the directions of the x-axis and y-axis, respectively. Segments 605 and 606 having frequencies higher than a threshold value are found in the histograms 603 and 604, and the area 602 thereby obtained is determined as the position of the attribute information area 201.

Next, the process of judging whether the attribute information area is present by the attribute-information-area presence judging unit 154 (at step S4) is explained. Whether the attribute information (score information) is displayed on each of the typical scenes extracted at step S2 is determined by comparing the overlapping portion 504 added up at step S3 with the overlapping portion (such as 503) of each typical scene and the scene immediately before. In other words, the overlapping portion 504 is compared with the overlapping portion (such as 503) of each typical scene and the scene immediately before, and when a certain number or more of pixels match, the typical scene has the attribute information (score information) displayed thereon.

Figure 12:
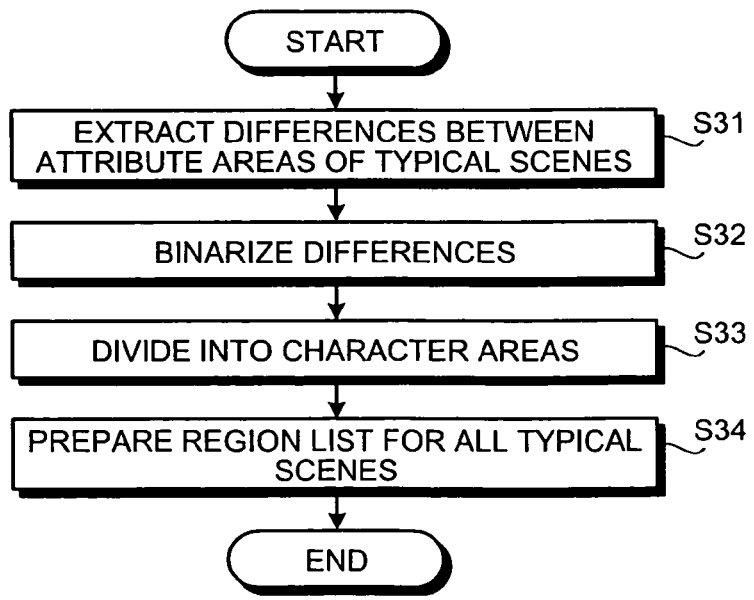
FIG. 12 is a flowchart of a process of extracting a character area.
Figure 13:
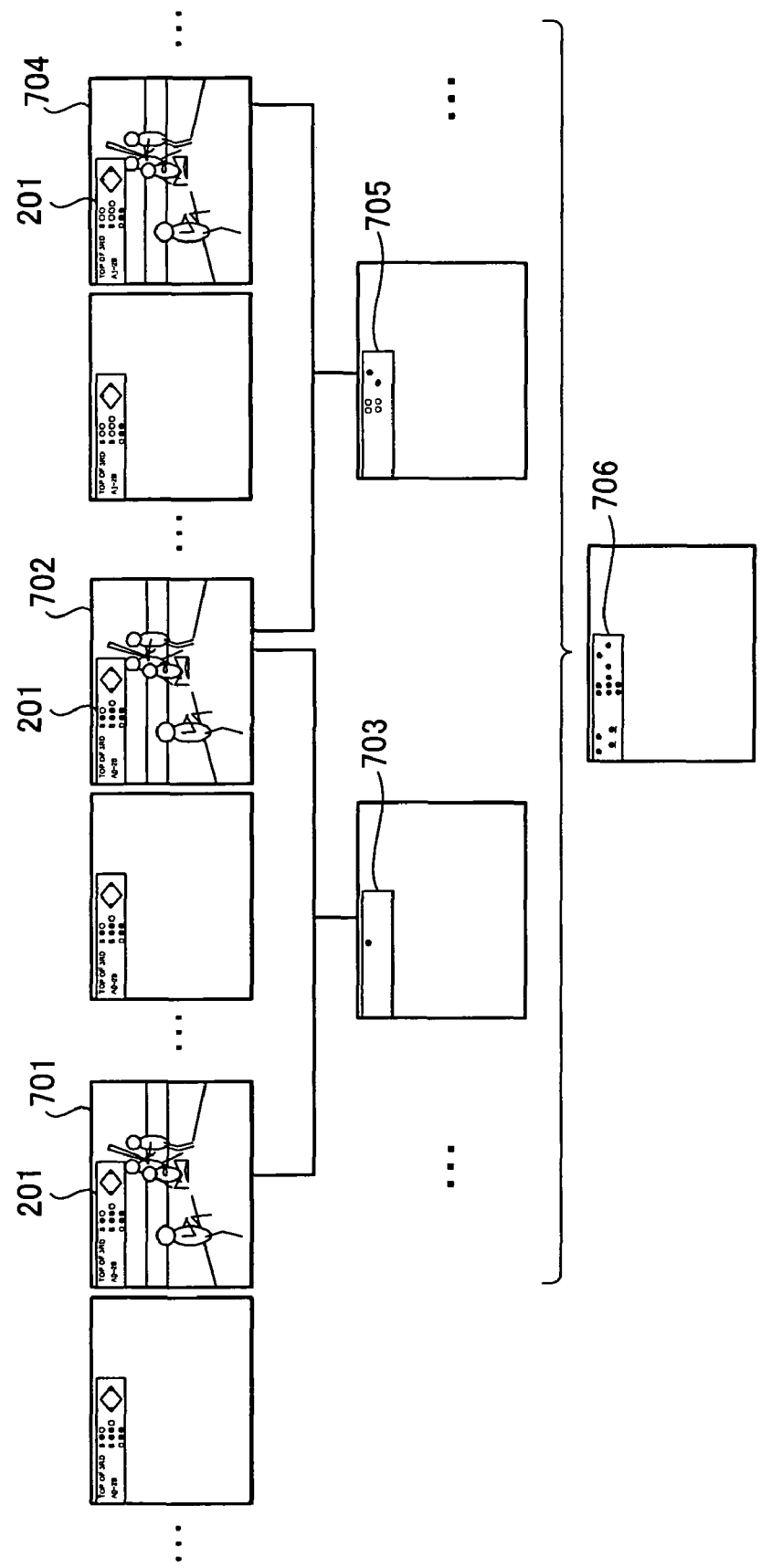
FIG. 13 is a schematic diagram for explaining a process of extracting a character area.

Next, the process of extracting a character area by the character-area extracting unit 155 (at step S5) is explained. FIG. 12 is a flowchart of the process of extracting a character area, while FIG. 13 is a schematic diagram for explaining the process of extracting a character area. First, differences between the attribute information areas 201 of any two adjacent typical scenes are extracted (at step S31), as indicated in FIG. 12. In FIG. 13, for instance, differences 703 between the attribute information areas 201 of a typical scene 701 and a typical scene 702 are calculated.

Next, the differences are binarized in accordance with a threshold value (at step S32). In this manner, only a portion that has any change between the attribute information areas 201 of the two typical scenes is extracted. Because such a typical scene reappears every pitching in a baseball game, changes are extracted for each ball that is pitched. Differences are obtained for other pairs of adjacent typical scenes. In FIG. 13, for instance, differences 705 are obtained between the attribute information areas 201 of the typical scene 702 and the typical scene 704.

Thereafter, portions of the attribute information areas 201 that exhibit such differences are grouped into regions (at step S33). Because the differences are binarized, the region division can be carried out by a region growing method, with which adjacent pixels having the same value are regarded as the same region. The region obtained in this manner is determined as a character area.

Finally, based on the character areas obtained for all the typical scenes, a region list 706 of areas that have any change in the video picture is prepared (at step S34). The list includes only one area for any set of overlapping areas.

FIG. 14 is a schematic diagram for explaining a process executed on the overlapping regions. In this drawing, a strike count is taken as an example for a process conducted on the overlapping regions. The dotted lines are included in the drawing only for the purpose of explanation, and are not present in reality. The numeral 801 shows an area indicating a difference when the count changes from two strikes to no strike due to a change of batters. An area 802 indicates a difference when the count changes from no strike to one strike. In the similar manner, an area 803 indicates a difference when the count changes from one strike to two strikes. The area 801 matches the combination of the areas 802 and 803 and overlaps each of the areas 802 and 803. The area 801 is not included in the area list, while the areas 802 and 803 that do not overlap each other are included therein. The areas similar to the areas 802 and 803 repeatedly appear in the video picture, but are included in the list only for once.

The process of assigning meaning to a character area by the character-area-meaning assigning unit 156 (at step S6) is explained next. The character-area-meaning assigning unit 156 assigns meaning to each area of the character area list extracted at step S5.

For a baseball game, for instance, meaning is assigned to the score region (character area) showing the count (strikes, balls, and outs) and the score. Rule information is used for the meaning assignment and compared with the features of the score region (character area) to assign the matching content to the score region. The rule information includes information on groups of the score regions (character area), positional relationship with other score regions (character areas), and rough positioning within each score region (character area). A group consists of several score regions that form one meaning. The rule information relates to the number of score regions (character areas) in a group, and the color and positional relationship thereof. For instance, the strike count consists of two score regions (character areas), and thus the two regions should be dealt with as one group. For this reason, at the first step of the meaning assigning process, the regions are sorted into groups, and then at the next step, the groups are compared relatively with one another.

FIG. 15 is a schematic diagram of an example of the rule information. As shown in FIG. 15, the rule information includes types of rules 901, rules 902 for corresponding groups, and rules for positional relationship 903. For instance, in relation to the "strike" count, a rule 902 is defined for a group that has "two regions of the same size and the same color that are horizontally adjacent to each other". Therefore, regions are sorted into groups in accordance with their positions and colors. The difference between adjacent regions and regions in the vicinity resides in threshold values for the distance between the regions. The distance between adjacent regions is shorter than the distance between regions in the vicinity. In relation to the "strike" count, a rule 903 is also defined, specifying the relationship of relative positions with other components, "the same x coordinate (when vertically arranged) or the same y coordinate (when horizontally arranged) as the left sides of the regions for the ball and out counts". The rules for positional relationship 903 are adopted to perform comparison, and the regions that satisfy a rule 903 is selected from among the regions sorted into groups in accordance with the rules 902, thereby completing the meaning assignment.

In a baseball game broadcast, for example, the use of such abstract rules reduces the influence of differences in screen designing among broadcast stations, thereby enhancing general versatility. The rule information does not have to be a single rule pattern, but there may be several patterns. For instance, a rule pattern in which the ball count is displayed in digits may be incorporated. Digits defined by the rule are ones that can be read as digits by selecting and reading a typical scene or more on which the attribute information area 201 is displayed. Score information presented in broadcasting of a sport game has a fixed form to a certain extent according to a kind of sport, with little differences among broadcast stations. Thus, several patters for each kind of sport will suffice. If general versatility is not required, the positions and sizes of score regions (character areas) may be specified, instead of abstract rule information, incorporating the arrangement of the score information for a specific broadcasting program as a template.

The process of generating the video attribute information by the character-area reading unit 157 (at step S7) is explained next. The character-area reading unit 157 reads the video attribute information 11, which is metadata of the video content, from each character area to which meaning is assigned at step S6, and outputs the video attribute information 11. FIG. 16 is a schematic diagram of an example of baseball score information. The score information of a baseball game in this drawing includes the inning, score, ball count, and runners on base. However, only part of such information (for example information including only the ball count) may be generated. If this is the case, only relevant information should be subjected to the meaning assignment in the process at step S6.

The process of reading the video attribute information 11 from the score region (character area) differs depending on the video attribute information 11 being graphics or characters. For instance, graphics are adopted to show the ball count and runners on base, which are expressed by the number of circles. For the graphics, each score region is checked to determine whether the score character information is in the display state or nondisplay state. In general, the display state involves high intensity and saturation, and thus the display state may be determined by use of threshold values. Alternatively, the score regions (character areas) of several typical scenes may be sorted into two classes (groups) so that regions with higher intensity and higher saturation can be selected. On the other hand, when the target to be read is characters, a baseball game broadcast employs only digits and characters for "top" and "bottom". This means that the types of characters are limited. Hence, templates for these characters are prepared in advance so that characters can be read out by comparing with the templates. Of course, a character recognizing technique adopting a general OCR may be employed so that general versatility is improved. Corrections are added to the score character information (video attribute information 11) read from the score region (character area) in accordance with the rules of the sports so that there will be no inconsistency. For instance, if digits for a score become small when there is no change in innings or the like, it is likely that the digits have been erroneously recognized. If there are any increased or unchanged digits that are read out with high reliability, these digits should be adopted. Furthermore, when an unusual recognition result is obtained from the process of reading graphics, such as the second or third circle of the ball count being lit with the first one unlit, a correction is made by referring to the reading result obtained before or after.

According to the present embodiment, an attribute information area which displays the attribute information therein and makes no change between frames of adjacent scenes that are defined by dividing the video content is extracted. Then, character areas in which individual characters in the attribute information area are present are extracted, and meaning is assigned thereto. The video attribute information, which is metadata on the video content, is read and output from the meaning given character areas. This saves manual operations of designating an image region in which the video attribute information is displayed, where the video attribute information is metadata relating to the video content such as scores and ball counts in a baseball game broadcast. The video attribute information can be automatically recognized and obtained from the video content, and thus the metadata relating to the video content can be easily generated.

In a sport game broadcast such as a baseball game, images that are shot in the same composition (typical scenes) repeatedly appear, such as a pitching scene in which a pitcher is shot from the back in a direction toward a batter. Such typical scenes are often repeated for every play of the sport, and each time of this scene, there is some change to the score information such as the score and ball count. According to the present embodiment, typical scenes that are repeated units such as pitching in a baseball game are automatically detected from the target video content, and the video attribute information is detected and recognized in accordance with the changes on the screen between the typical scenes. Metadata on scores and ball counts is thereby automatically generated. In this manner, the metadata on the video content can be still more easily generated.

The present invention according to a second embodiment is explained with reference to FIGS. 17 and 18. The same components as the first embodiment are given the same reference numerals, and the explanation thereof is omitted.

Figure 17:
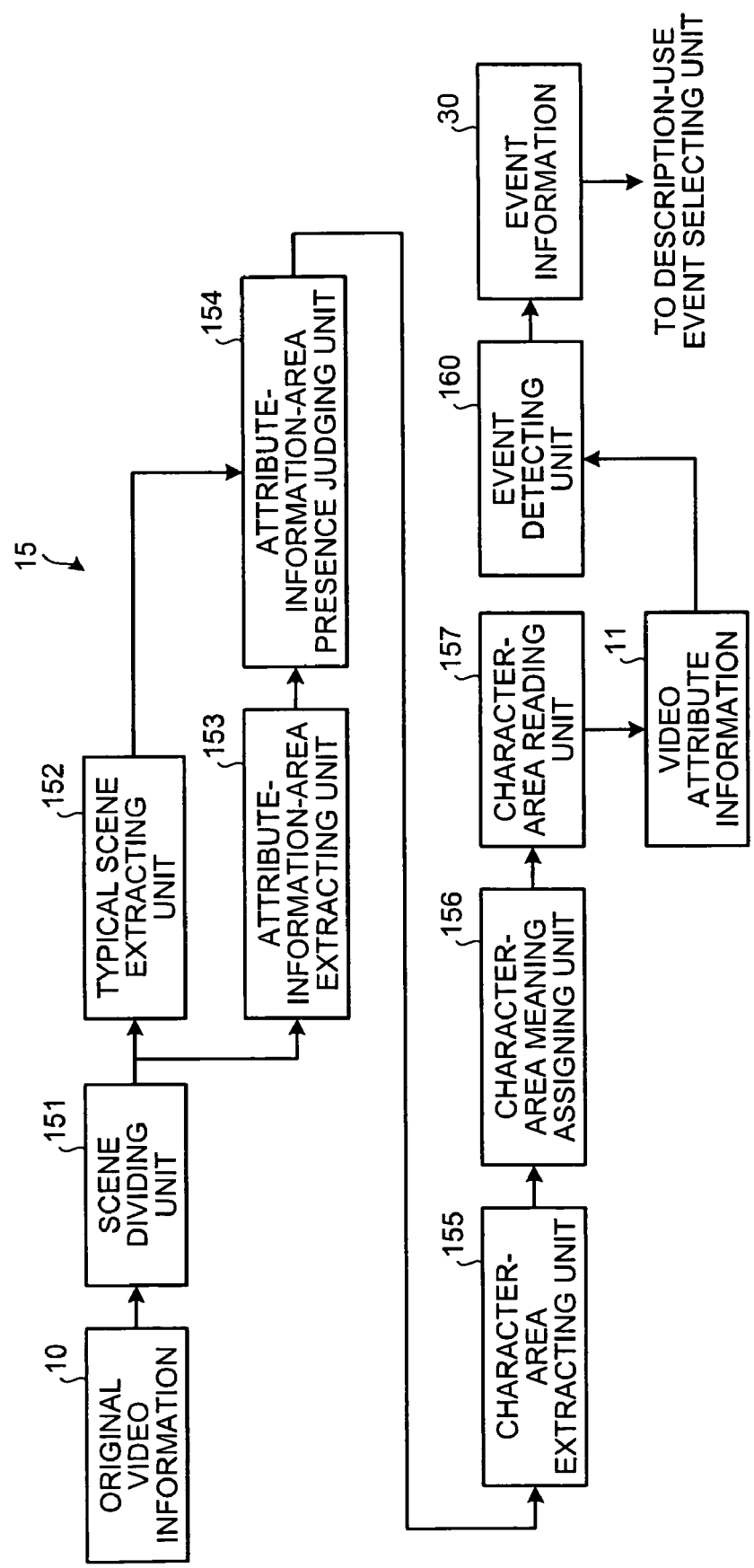
FIG. 17 is a block diagram for showing an overview of the structure of a video-attribute-information generating unit according to a second embodiment.

FIG. 17 is a block diagram for showing an overview of the structure of a video-attribute-information generating unit 15 according to a second embodiment. As shown in FIG. 17, the video-attribute-information generating unit 15 according to the second embodiment includes an event detecting unit 160 in addition to the structure of the video-attribute-information generating unit 15 according to the first embodiment, and event information 30 detected by the event detecting unit 160 is output to the description-use event selecting unit 18 (see FIG. 2).

An event denotes anything that happens in a game. An event may be a hit, a home-run, or a change of batters. At such an event, a certain change occurs to the score information (video attribute information 11). Thus, the event detecting unit 160 compares the pattern of the change to the score information (video attribute information 11) with event rule information that is prepared in advance. When a certain pattern is observed, the pattern is detected as the event information 30. The event rule information may be "the strike and ball counts returned to 0 when there is a hit", "the strike and ball counts returned to 0, while the out count incremented when the batter retires", or "no runner on base and the score incremented when there is a home-run". Such event rule information is prepared for each event that is to be detected, and compared with the video attribute information 11 to output the event information 30.

The score information (video attribute information 11) shown in FIG. 16 is taken as an example. When the score information changes from 1001 to 1002, the strike and ball counts are cleared, while the out count is unchanged. This shows that the result of the pitch at 1001 is a hit. When the score information changes from 1003 to 1004, the strike and ball counts and on-base entry are all cleared, with the score increased. This shows the result is a home-run.

The integrating unit 20 thereby sequentially reproduces the typical scenes including the event information 30 selected by the description-use event selecting unit 18. More specifically, the integrating unit 20 receives the time of the typical scene obtained by the typical scene extracting unit 152, and upon receipt of an instruction for skipping, the integrating unit 20 skips the video picture that is being reproduced to the next typical scene. Skipping to the typical scene of the next event may be performed automatically at the timing when the reproduction of the current typical scene is completed, or at the timing of receiving an instruction from outside. When the reproduction is resumed after the skipping, the description preparing unit 19 prepares a description based on the score information (video attribute information 11) corresponding to the typical scene. As discussed above, the description is generated by inserting the score information into a description template (description preparing information 13). The template includes a fixed phrase without portions corresponding to the score information (video attribute information 11), and the score information (video attribute information 11) should be inserted into blanks. The template may be more than one type, and may be switched around in accordance with the types of the score information (video attribute information 11), the description phrases that are placed before and after the phrase, the development of the game, the user's preference, and the like. For instance, the score information 1005 in FIG. 16 is inserted into a template "in the (top/bottom) of the (-th) inning, with the score (score)-(score), the count (ball)-(strike). Then, the phrase "in the bottom of the fifth inning, with the score 2-3, the count 1-1" is obtained. The description prepared in this manner is converted to audible information such as voice by sound synthesis, and reproduced in synchronization with the video picture that is to be reproduced. With such a structure, the user can skip scenes to view hit scenes and final pitches to batters only so that the viewing hours can be shortened. Furthermore, because the situation of the game is audibly introduced at each scene where the viewing is resumed, the user can understand the development of the game.

During the skipping operation, highlighting may be performed so that changes in the score regions (character areas) can be easily noticed. As illustrated in FIG. 18, when a typical scene including score regions (character areas) 1401 changes to a typical scene including score regions (character areas) 1402 by a skipping operation, the integrating unit 20 highlights the changed score region (character area) by drawing a box around the changed portion as shown in 1403 so that the change can be easily noticed. Because the difference between the attribute information areas 201 of the two adjacent typical scenes is already obtained by the character-area extracting unit 155, the region corresponding to the difference is highlighted. The highlighting manner may be suitably determined. The portion may be placed in a box as shown in 1403, changed in color, or caused to blink. With such a display, the viewer can quickly notice which portion is changed when the screen is switched. In this structure, the highlighting is provided when a change occurs at skipping, but it may be provided during continuous reproduction of the video picture.

According to the present embodiment, event information, which is detailed metadata, can be formed from the video attribute information, and the video picture can be viewed in a short period of time by watching only scenes where such event information appears.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video-attribute-information output apparatus comprising:
    a scene dividing unit that detects a change in scenes where there is little similarity between frames of video content, and divides the video content into a plurality of scenes;
    an attribute-information-area extracting unit that extracts an attribute information area in which attribute information is displayed and which has no change between specific frames of adjacent scenes that are obtained by dividing by the scene dividing unit;
    a character-area extracting unit that extracts character areas in which video attribute information in individual characters that is metadata of the video content is present, from the attribute information area extracted by the attribute-information-area extracting unit;
    a character-area-meaning assigning unit that assigns meanings to the character areas extracted by the character-area extracting unit, by referring to rule information that specifies the meanings for the character areas;
    a video-attribute-information output unit that reads the video attribute information from the character areas to which the meanings are assigned, and outputs the video attribute information;
    a typical scene extracting unit that extracts typical scenes that are images shot in a same composition and repeatedly appear in the video content, from the adjacent scenes obtained by dividing by the scene dividing unit; and
    a region judging unit that judges whether each of the extracted typical scenes has the extracted attribute information area, wherein
    the character-area extracting unit extracts character areas in which the individual characters are present in the extracted attribute information area and judged as being in a typical scene by the region judging unit.

2. The apparatus according to claim 1, wherein the attribute-information-area extracting unit extracts attribute information areas from a boundary between a typical scene and a scene immediately before the typical scene.

3. The apparatus according to claim 1, wherein the typical scene extracting unit includes:
    a classifying unit that classifies the scenes obtained by the dividing unit into groups in accordance with similarity based on features of the scenes; and
    a determining unit that determines all the scenes classified into the group as the typical scenes, when the images shot in the same composition appear in the scenes of a group at a frequency equal to or higher than a criterion level.

4. The apparatus according to claim 3, wherein the criterion level used by the determining unit is whether a total number of images of the group that are shot in the same composition exceeds a predetermined threshold value.

5. The apparatus according to claim 3, wherein the criterion level used by the determining unit is whether a total hours of images of the group that are shot in the same composition accounts for a predetermined percentage or higher of a time length of the video content.

6. The apparatus according to claim 1, wherein
    the rule information includes contents of meanings, first rules that are brought into correspondence with the contents of the meanings and are to be followed when grouping the character areas in accordance with at least one of a relationship of relative positions and a relationship of colors, and second rules that specify a positional relationship of the character areas; and
    the character-area-meaning assigning unit selects a content of meaning for a group of character areas that satisfy a second rule from among the character areas grouped in accordance with the first rules, and assigns meaning to the group of the character areas.

7. The apparatus according to claim 1, wherein the video-attribute-information output unit corrects a recognition result when there is any inconsistency in the video attribute information read from the character areas to which the meaning is assigned.

8. The apparatus according to claim 1, further comprising an event detecting unit that detects the video attribute information output from the video-attribute-information output unit, as event information, when the video attribute information is compared with event rule information that includes a relationship between changing patterns of the video attribute information and the events, and a specific pattern is found therein.

9. A video digest forming apparatus comprising:
    a video-attribute-information output apparatus according to claim 1;
    an importance calculating unit that calculates a level of importance for each event included in the video attribute information output from the video-attribute-information output apparatus;
    a video segment selecting unit that selects a video segment of the video content to be included in a digest video picture in accordance with the level of importance calculated by the importance calculating unit;
    a description-use event selecting unit that selects a description-use event from a list of events to use in preparation of a description that is to be included in the digest video picture;
    a description preparing unit that prepares the description from the description-use event selected by the description-use event selecting unit; and
    an integrating unit that combines the selected video segment and the description, and forms digest video information that includes both of the video segment and the description.

10. The apparatus according to claim 9, wherein the integrating unit sequentially outputs the digest video information including the description-use event selected by the description-use event selecting unit, and reproduces the digest video information in a skipping manner.

11. The apparatus according to claim 9, wherein the integrating unit highlights character areas that exhibit changes during reproduction in a skipping manner.

12. A computer program product having a non-transitory computer readable medium including program instructions for outputting video attribute information, wherein the instructions, when executed by a computer, cause the computer to perform:

detecting a change in scenes where there is little similarity between frames of video content, and dividing the video content into a plurality of scenes;

extracting an attribute information area in which attribute information is displayed and which has no change between specific frames of the divided adjacent scenes;

extracting character areas in which video attribute information in individual characters that is metadata of the video content is present, from the extracted attribute information area;

assigning meanings to the extracted character areas by referring to rule information that specifies the meanings for the character areas;

reading the video attribute information from the character areas to which the meanings are assigned, and outputting the video attribute information;

extracting typical scenes that are images shot in a same composition and repeatedly appear in the video content, from the adjacent scenes obtained by dividing; and judging whether each of the extracted typical scenes has the extracted attribute information area, wherein the extracting extracts character areas in which the individual characters are present in the extracted attribute information area and judged as being in a typical scene.

13. A video-attribute-information output method comprising:

detecting a change in scenes where there is little similarity between frames of video content, and dividing the video content into a plurality of scenes;

extracting an attribute information area in which attribute information is displayed and which has no change between specific frames of the divided adjacent scenes;

extracting character areas in which video attribute information in individual characters that is metadata of the video content is present, from the extracted attribute information area;

assigning meanings to the extracted character areas by referring to rule information that specifies the meanings for the character areas;

reading the video attribute information from the character areas to which the meanings are assigned, and outputting the video attribute information;

extracting typical scenes that are images shot in a same composition and repeatedly appear in the video content, from the adjacent scenes obtained by dividing; and judging whether each of the extracted typical scenes has the extracted attribute information area, wherein the extracting extracts character areas in which the individual characters are present in the extracted attribute information area and judged as being in a typical scene.

\* \* \* \* \*